(12) United States Patent
Chen et al.

(10) Patent No.: US 12,438,372 B2
(45) Date of Patent: Oct. 7, 2025

(54) ISLAND MICROGRID SYSTEM, AND INTERACTIVE OSCILLATION SUPPRESSION METHOD AND SYSTEM THEREFOR

(71) Applicant: GUANGDONG ZHICHENG CHAMPION GROUP CO., LTD., Guangdong (CN)

(72) Inventors: Yandong Chen, Guangdong (CN); Jian Guo, Guangdong (CN); Wenhua Wu, Guangdong (CN); Zhiwei Xie, Guangdong (CN); Leming Zhou, Guangdong (CN); Xiaoping Zhou, Guangdong (CN); Qianming Xu, Guangdong (CN); Zhixing He, Guangdong (CN)

(73) Assignee: Guangdong Zhicheng Champion Group Co, Ltd., Guangdong (CN)

( * ) Notice: Subject to any disclaimer, the term of this patent is extended or adjusted under 35 U.S.C. 154(b) by 44 days.

(21) Appl. No.: 18/269,464

(22) PCT Filed: Nov. 7, 2022

(86) PCT No.: PCT/CN2022/130250
§ 371 (c)(1),
(2) Date: Jun. 23, 2023

(87) PCT Pub. No.: WO2023/083128
PCT Pub. Date: May 19, 2023

(65) Prior Publication Data
US 2024/0047969 A1    Feb. 8, 2024

(30) Foreign Application Priority Data
Nov. 11, 2021 (CN) .......................... 202111332841.9

(51) Int. Cl.
*H02J 3/24* (2006.01)
*G05B 6/02* (2006.01)
*H02J 3/38* (2006.01)

(52) U.S. Cl.
CPC ................. *H02J 3/24* (2013.01); *G05B 6/02* (2013.01); *H02J 3/388* (2020.01)

(58) Field of Classification Search
CPC .... H02J 3/24; H02J 3/388; H02J 3/381; H02J 2310/10; H02J 3/002; H02J 3/241;
(Continued)

(56) References Cited

U.S. PATENT DOCUMENTS

2016/0006338 A1*  1/2016  Sakimoto .......... H02M 7/53875
                                              363/131
2016/0211784 A1*  7/2016  Fujisawa .................. H02P 9/30
(Continued)

FOREIGN PATENT DOCUMENTS

CN       110445186 A      11/2019
CN       111541274 A       8/2020
(Continued)

OTHER PUBLICATIONS

Tianwen Zheng, "Adaptive Damping Control Strategy of Virtual Synchronous Generator for Frequency Oscillation Suppression", Dec. 19, 2016,12th IET International Conference on AC and DC Power Transmission (ACDC 2016) (Year: 2016).*
(Continued)

*Primary Examiner* — Christopher W Carter
(74) *Attorney, Agent, or Firm* — Caesar Rivise, PC

(57) ABSTRACT

The present invention discloses an island microgrid system and an interactive oscillation suppression method and system therefor. A source-side virtual synchronous machine and a load-side virtual synchronous machine are combined to provide virtual inertia and damping. The present invention provides a d-axis inductive current feedforward control method and a d-axis voltage feedback control method to remodel impedances of VSGs, so as to reduce impedance amplitudes of the VSGs. Therefore, low-frequency interac-
(Continued)

tion between the VSG and LVSM may be suppressed. The present invention may be used to solve interactive oscillation problems of an alternating-current island microgrid composed of a plurality of source-load virtual synchronous machines.

8 Claims, 3 Drawing Sheets

(58) Field of Classification Search
CPC .......... H02J 3/46; H02J 3/466; H02J 2203/10; G05B 6/02
See application file for complete search history.

(56) References Cited

U.S. PATENT DOCUMENTS

| | | | |
|---|---|---|---|
| 2020/0212823 A1 | 7/2020 | Gong | |
| 2021/0249862 A1* | 8/2021 | Awal | H02J 3/38 |
| 2021/0296883 A1* | 9/2021 | Yin | H02J 3/48 |

FOREIGN PATENT DOCUMENTS

| | | |
|---|---|---|
| CN | 112039112 A | 12/2020 |
| CN | 114024309 A | 8/2022 |
| WO | WO2019/035760 A1 | 2/2019 |

OTHER PUBLICATIONS

Toshinobu Shintain, "Oscillation Damping of a Distributed Generator Using a Virtual Synchronous Generator", Apr. 2014, IEEE Transactions on Power Delivery, vol. 29, No. 2 (Year: 2014).*
English abstract of CN114024309A.
English abstract of CN112039112A.
English abstract of CN110445186A.
English abstract of CN111541274A.
Liu et al., "Harmonic Suppression Method for VSG Connected to Weak Grid and Device Development", Non-Official Translation, Thesis of Master's Degree of Engineering of Hunan University, Section 3.3, pp. 23-38 (May 7, 2020).
International Search Report from corresponding PCT Application No. PCT/CN2022/130250 dated Jan. 20, 2023.

* cited by examiner

ISLAND MICROGRID SYSTEM, AND INTERACTIVE OSCILLATION SUPPRESSION METHOD AND SYSTEM THEREFOR

CROSS REFERENCE TO RELATED APPLICATIONS

This application is a U.S. National Phase Application of PCT/CN/2022/130250, filed Nov. 7, 2022, which claims priority to Chinese Patent Application No. 202111332841.9, filed on Nov. 11, 2021, which is incorporated by reference in its entirety.

FIELD OF THE INVENTION

The present invention relates to a low-frequency oscillation suppression technology for grids, in particular to an island microgrid system and an interactive oscillation suppression method and system therefor.

BACKGROUND OF THE INVENTION

In recent years, as energy shortage and environmental pollution problems become increasingly prominent, distributed microgrids composed of photovoltaic systems, wind power generation, energy storage, and voltage source converters (VSCs) have been widely used. However, with gradually increasing popularity of power electronic converters, low inertia of systems and random power generation of renewable energy threaten stability of island microgrids.

To solve this problem, virtual synchronous machines (VSMs) emerged, which simulate dynamic characteristics of synchronous motors and provide virtual inertia and damping for power systems. The virtual synchronous machines may be classified into two types: virtual synchronous generators (VSGs) and load virtual synchronous machines (LVSMs). Currently, the VSGs have received extensive research, including implementation, parameter design, applications, and small signal impedance modeling. In addition to power supply sides, power electronic loads connected to island microgrids are increasingly required to provide inertia and damping. Therefore, an operating LVSM may be introduced into a PWM rectifier in the absence of a phase locked loop. According to existing research, the VSGs or LVSMs may operate stably even in weak grids, but it cannot be guaranteed that systems in which the VSGs supply power to the LVSMs are still stable. Moreover, due to negative resistance behaviors of the LVSMs in q-q channels in low frequency ranges, interaction dynamics between the VSGs and the LVSMs may lead to instability, which limits their large-scale application in the island microgrids. Therefore, it is necessary to study interaction dynamics between the VSGs and the LVSMs. Generally, methods for suppressing interactive oscillations in the island microgrids are roughly classified into two types. One type is implemented by an external device, and the other type is implemented by an improved controller. Compared with additional external devices, it is more economical to suppress oscillations through the improved controller. It has been proposed in the literature to enhance stability of a VSG in a weak grid through virtual impedance, and harmonic virtual impedance has been designed to suppress harmonics of the VSG. However, virtual impedance control may cause voltage drop in the VSG. In addition, for similar island microgrids, methods for parameter optimization have been proposed in the literature to alleviate interaction between VSIs and VSRs. Moreover, an active compensation technology has also been proposed to maintain stability of an entire system composed of a plurality of VSIs and VSRs. However, due to different impedances of the LVSMs and the VSRs, existing technologies have not studied methods for suppressing interactive oscillations of the VSGs and the LVSMs.

SUMMARY OF THE INVENTION

A technical problem to be solved by the present invention is to provide an island micro grid system and an interactive oscillation suppression method and system therefor to effectively suppress interactive oscillations of VSGs and LVSMs in response to the shortcomings of the prior art.

To solve the above technical problem, a technical solution adopted by the present invention is as follows: An interactive oscillation suppression method for an island microgrid system, the island microgrid system includes a plurality of power supply units; each power supply unit includes a source-side virtual synchronous generator and a load-side virtual synchronous generator; the source-side virtual synchronous generator and the load-side virtual synchronous generator are connected in series; the load-side virtual synchronous generator is connected to a load; and the method includes the following steps:

S1, obtaining an output voltage amplitude $E_m$ of the source-side virtual synchronous generator according to a d-axis component $u_d$ of three-phase output voltage of the source-side virtual synchronous generator, instantaneous reactive power Q of the source-side virtual synchronous generator and an instruction value $Q_{set}$ of the instantaneous reactive power Q, where a calculation formula for $E_m$ is as follows:

$$E_m = (D_q(U_n - u_d) + Q_{set} - Q)/(Ks);$$

where $D_q$ represents a given reactive power-voltage droop coefficient; $U_n$ represents a rated terminal voltage amplitude of the source-side virtual synchronous generator; K is a given excitation regulation coefficient; and s is a Laplace operator;

S2, obtaining a phase angle θ of the source-side virtual synchronous generator according to active power P of the source-side virtual synchronous generator and an instruction value P* of the active power P, where a calculation formula for θ is:

$$\theta = \frac{P^* - P + D_p \omega_n^2}{(Js + D_p)s\omega_n};$$

where $D_p$ represents a damping coefficient; $\omega_n$ represents a synchronous angular velocity of an island microgrid system; and J is a rotor inertia of VSG;

S3, subtracting a product of the current and impedance of the source-side virtual synchronous generator from the voltage amplitude $E_m$ of the source-side virtual synchronous generator to construct virtual impedance, and obtaining a d-axis voltage instruction value $u_d^*$ and a q-axis voltage instruction value $u_q^*$, which are calculated as follows:

$$\begin{bmatrix} u_d^* \\ u_q^* \end{bmatrix} = \begin{bmatrix} E_m \\ 0 \end{bmatrix} - \begin{bmatrix} L_v s + R_v & -\omega_n L_v \\ L_v & L_v s + R_v \end{bmatrix} \begin{bmatrix} i_d \\ i_q \end{bmatrix};$$

where $i_d$ and $i_q$ are a d-axis component and a q-axis component of three-phase current of the source-side virtual synchronous generator respectively; and $R_v$ and $L_v$ are a resistance value and an inductance value of given virtual impedance respectively;

S4, solving a difference between the d-axis voltage instruction value $u_d^*$ and a d-axis component of three-phase voltage of the source-side virtual synchronous generator, and solving a difference between the q-axis voltage instruction value $u_q^*$ and a q-axis component of three-phase voltage of the source-side virtual synchronous generator, and respectively performing PI control on the differences to obtain current instruction values $i_{d0}^*$ and $i_q^*$;

S6, calculating an instruction value $i_d^*$ of the d-axis current component of the three-phase output current of the source-side virtual synchronous generator by using the following formula:

$$i_d^* = i_{d0}^* - i_{d1}^* + i_{d2}^*;$$

S7, solving a difference between the d-axis current instruction value $i_d^*$ and the d-axis component $i_d$ of the three-phase current of the source-side virtual synchronous generator, and solving a difference between the q-axis current instruction value $i_q^*$ and the q-axis component $i_q$ of the three-phase current of the source-side virtual synchronous generator, and respectively using the differences as input of a PI controller to obtain a duty ratio $d_d$ of the d-axis and a duty ratio $d_q$ of the q-axis; and S8, obtaining duty ratios $d_a$, $d_b$ and $d_c$ in a three-phase static coordinate system according to the duty ratio $d_d$ of the d-axis, the duty ratio $d_q$ of the q-axis and the phase angle $\theta$ of the source-side virtual synchronous generator, and controlling on-off of a switch tube of the source-side virtual synchronous generator, $$\begin{cases} d_a = d_d\cos(\theta) - d_q\sin(\theta) \\ d_b = d_d\cos\left(\theta - \frac{2\pi}{3}\right) - d_q\sin\left(\theta - \frac{2\pi}{3}\right) \\ d_c = d_d\cos\left(\theta + \frac{2\pi}{3}\right) - d_q\sin\left(\theta + \frac{2\pi}{3}\right) \end{cases};$$

The present invention remodels impedances of VSGs through a combination of d-axis inductive current feedforward control and d-axis voltage feedback control to reduce impedance amplitudes of the VSGs. Therefore, low-frequency interaction between the VSGs and the LVSMs may be alleviated, thereby suppressing interactive oscillations of the VSGs and the LVSMs and ensuring stability of the island microgrid system.

In step S6, $i_{d1}^*$ and $i_{d2}^*$ are a voltage feedback component and a current feedforward component of the d-axis respectively, which are calculated as follows:

$$i_{d1}^* = \left(\frac{C_f s}{T_c s + 1} + \frac{L_f C_f s^2}{G_m G_i (T_c s + 1)}\right) u_d;$$

$$i_{d2}^* = \frac{1}{T_c s + 1} + \frac{L_f s}{G_m G_i (T_c s + 1)^2} i_d;$$

where $L_f$ and $C_f$ are an inductance value and a capacitance value of an LC filter of the VSG respectively; $T_c$ is a time constant of a low-pass filter; $G_m = U_{dc0}/2$; and $G_i = k_{pi} + k_{ii}/s$, where $k_{pi}$ and $k_{ii}$ are a proportional gain and an integral gain of the current PI controller.

The present invention further provides an interactive oscillation suppression system for an island microgrid system, including a computer device, where the computer device is configured or programmed to execute the steps of the interactive oscillation suppression method of the present invention.

The present invention further provides an island microgrid system, including a plurality of power supply units; each power supply unit includes a source-side virtual synchronous generator and a load-side virtual synchronous generator; the source-side virtual synchronous generator and the load-side virtual synchronous generator are connected in series; the load-side virtual synchronous generator is connected to a load; the source-side virtual synchronous generator is connected to a processor; and the processor is configured or programmed to execute the steps of the interactive oscillation suppression method of the present invention. Because the VSGs and the LVSMs can independently participate in regulation of voltage and frequency of the system and do not rely on an additional communication network to achieve two-level control, the island microgrid system of the present invention may avoid potential network attacks. Meanwhile, the island microgrid system of the present invention avoids low-frequency interactive oscillations, which improves stability of the island microgrid system and enables the island microgrid system to be applied in engineering.

In order to facilitate obtaining corresponding data, the processor of the present invention samples the three-phase output current of the source-side virtual synchronous generator through a current sampling circuit; the processor samples the three-phase output voltage of the source-side virtual synchronous generator through a voltage sampling circuit; and the processor outputs a duty ratio signal to a switch tube of the source-side virtual synchronous generator.

Compared with the prior art, beneficial effects of the present invention are as follows:
1. The method of the present invention may suppress interactive oscillations of VSG and LVSM, which ensures the stability of the island microgrid system;
2. The method of the present invention maintains dynamic performance of the island microgrid system, and is simple and economical in control; and
3. The island microgrid system of the present invention may support voltage and frequency stability from both the source-side and the load-side, may also omit secondary communication to avoid potential network attacks, and is safe and reliable in use.

DETAILED DESCRIPTION OF THE EMBODIMENTS

Figure 1:
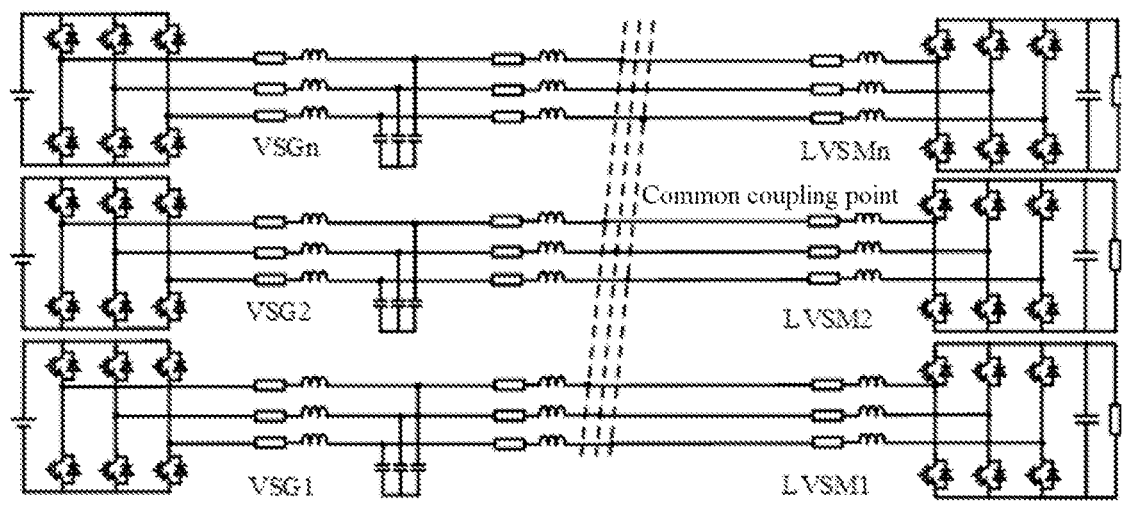
FIG. 1 shows an island microgrid system composed of source-side and load-side virtual synchronous machines in Embodiment 1 of the present invention.

Embodiment 1 of the present invention provides an island microgrid system including source-side and load-side virtual synchronous machines. As shown in FIG. 1, the island microgrid system in Embodiment 1 combines VSGs and LVSMs. The island microgrid system includes a plurality of power supply units, each power supply unit includes a VSG and an LVSM, and the LVSM is connected to a load. A connecting point between the VSG and the LVSM is referred to as a common coupling point.

There are totally n power supply units in Embodiment 1 of the present invention, so there are totally n VSGs (VSG1, VSG2, . . . , VSGn) and n LVSMs (LVSM1, LVSM2, . . . , LVSMn).

Figure 2:
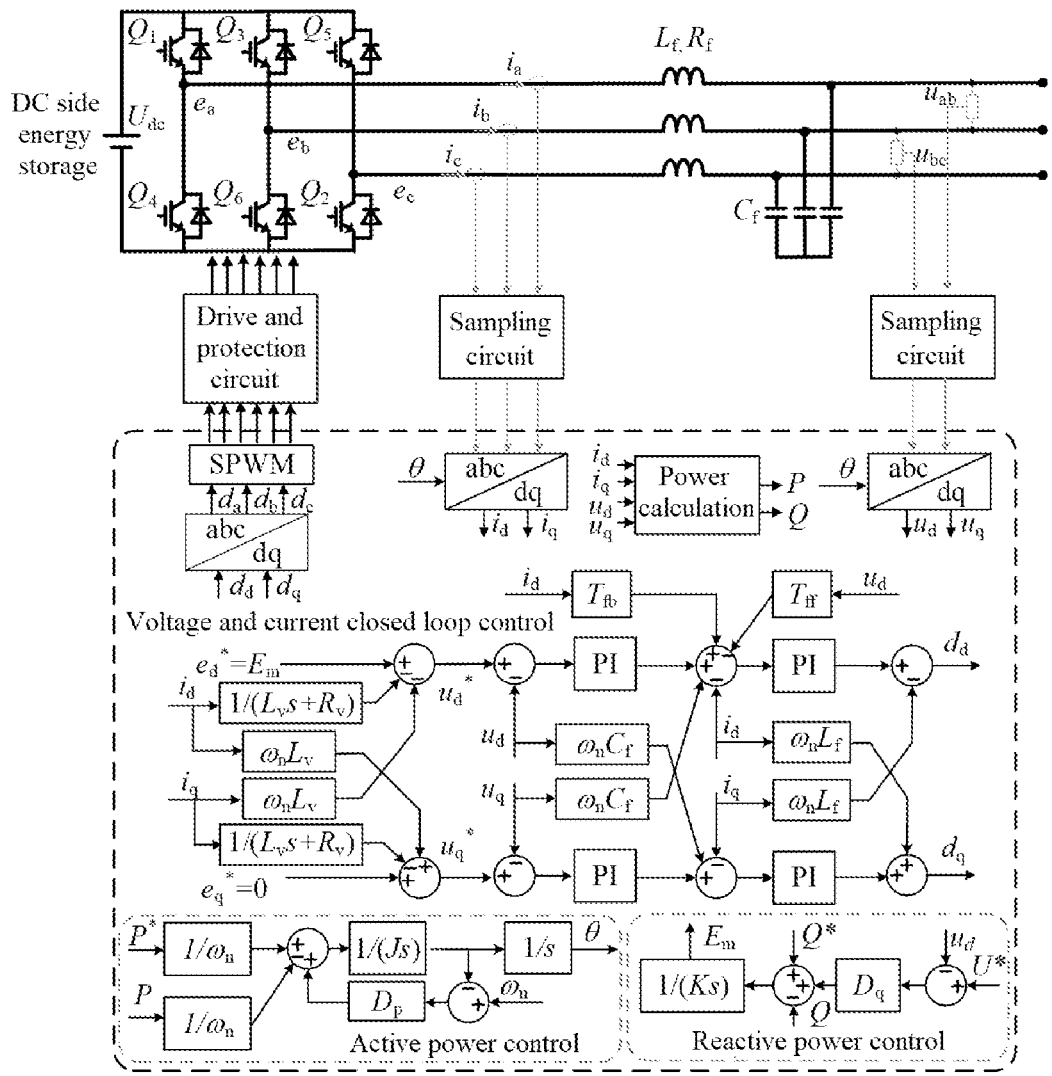
FIG. 2 is a diagram of main circuits and control modes of virtual synchronous machines after impedance remodeling in Embodiment 2 of the present invention.

Embodiment 2 of the present invention provides an interactive oscillation suppression method for the island microgrid system in Embodiment 1. As shown in FIG. 2, the interactive oscillation suppression method in Embodiment 2 of the present invention performs control from source-side virtual synchronous generators. A source-side virtual synchronous generator includes an LC filter, a three-phase inverter circuit, a sampling circuit, a direct-current side energy storage capacitor, a controller, and a drive and protection circuit; the LC filter is connected to an output side of the three-phase inverter circuit; a bridge arm of the three-phase inverter circuit is connected in parallel to the direct-current side energy storage capacitor; an input end of the sampling circuit is connected to the LC filter; an output end of the sampling circuit is connected to an input end of the controller; the controller is connected to an input end of the drive and protection circuit; and an output end of the drive and protection circuit is used for driving the three-phase inverter circuit. The sampling circuit includes a voltage sampling circuit and a current sampling circuit, the current sampling circuit is connected to an input side of the LC filter, the current sampling circuit is used for sampling three-phase current $i_a$, $i_b$ and $i_c$ of the LC filter, the voltage sampling circuit is connected to an output side of the LC filter, and the voltage sampling circuit is used for sampling line voltage $u_{ab}$ and $u_{bc}$ of the LC filter.

The interactive oscillation suppression method in Embodiment 2 of the present invention includes the following steps:

1) sampling three-phase output current $i_a$, $i_b$ and $i_c$ of the LC filter and line voltage $u_{ab}$ and $u_{bc}$ of the LC filter;
2) calculating three-phase phase voltage $u_a$, $u_b$ and $u_c$ from the three-phase line voltage $u_{ab}$ and $u_{bc}$;
3) calculating a d-axis component $u_d$ and a q-axis component $u_q$ of three-phase voltage and calculating a d-axis component $i_d$ and a q-axis component $i_q$ of three-phase current respectively from the three-phase output current $i_a$, $i_b$ and $i_c$ of the LC filter and the three-phase phase voltage $u_a$, $u_b$ and $u_c$ of a grid side;
4) calculating instantaneous active power P and reactive power Q according to the d-axis component $u_d$ and the q-axis component $u_q$ of the three-phase voltage and the d-axis component $i_d$ and the q-axis component $i_q$ of the three-phase current;
5) calculating an electromagnetic torque $T_e$ of the virtual synchronous generator from the instantaneous active power P, $T_e = P/\omega_n$, where $\omega_n$ represents a synchronous angular velocity of a grid;
6) calculating a phase angle $$\theta = \frac{T_{set} - T_c + D_p \omega_n}{(Js + D_p)s}$$

of the virtual synchronous generator from $T_{set}$, where $D_p$ represents a damping coefficient; and $T_{set}$ represents a mechanical torque of the virtual synchronous generator;

7) calculating an output voltage amplitude of the virtual synchronous generator from the d-axis component $u_d$ of the grid side voltage and the reactive power Q, $E_m = (D_q(U_n - u_d) + Q_{set} - Q)/(Ks)$, where $E_m$ represents the output voltage amplitude of the virtual synchronous generator; $D_q$ represents a reactive power-voltage droop coefficient; $U_n$ represents a rated terminal voltage amplitude of the virtual synchronous generator; K is an excitation regulation coefficient; and $Q_{set}$ represents a reactive power instruction value of the virtual synchronous generator;
8) solving a difference between a voltage instruction value $u_d^*$ of the d-axis of the source-side virtual synchronous generator and a d-axis component of the three-phase voltage of the source-side virtual synchronous generator, and solving a difference between a voltage instruction value $u_q^*$ of q-axis of the source-side virtual synchronous generator and a q-axis component of the three-phase voltage of the source-side virtual synchronous generator, and respectively performing PI control on the differences to obtain current instruction values $i_{d0}^*$ and $i_q^*$;
9) obtaining an instruction value $i_d^*$ of the d-axis current component of the three-phase current through output of the PI controller, a voltage feedback component $i_{d1}^*$ of the d-axis and a current feedforward component $i_{d2}^*$ of the d-axis, where a calculation formula for $i_d^*$ is $i_d^* = i_{d0}^* - i_{d1}^* + i_{d2}^*$, and the voltage feedback component $i_{d1}^*$ of the d-axis and the current feedforward component $i_{d2}^*$ of the d-axis are calculated as follows:

$$i_{d1}^* = \overbrace{\left(\frac{C_f s}{T_c s + 1} + \frac{L_f C_f s^2}{G_m G_i (T_c s + 1)}\right)}^{T_{fb}} u_d;$$

$$i_{d2}^* = \overbrace{\left(\frac{1}{T_c s + 1} + \frac{L_f s}{G_m G_i (T_c s + 1)^2}\right)}^{T_{ff}} i_d;$$

where $T_c$ is a time constant of a low-pass filter, $G_m = U_{dc0}/2$; $G_i = k_{pi} + k_{ii}/s$, where $k_{pi}$ is a proportional gain of a current PI controller; and $k_{ii}$ is an integral gain of the current PI controller;
10) solving a difference between the d-axis current instruction value $i_d^*$ of the source-side virtual synchronous generator and the d-axis component $i_d$ of the three-phase current of the source-side virtual synchronous generator, and solving a difference between the q-axis current instruction value $i_q^*$ of the source-side virtual synchronous generator and the q-axis component $i_q$ of the three-phase current of the source-side virtual synchronous generator, and respectively using the differences as input of the PI controller to obtain a duty ratio $d_d$ of the d-axis and a duty ratio $d_q$ of the q-axis;
11) obtaining duty ratios $d_a$, $d_b$ and $d_c$ in a three-phase static coordinate system according to the duty ratios of the d-axis and the q-axis and the phase angle θ; and
12) controlling on-off of switch tubes of power electronic apparatuses according to the duty ratios $d_a$, $d_b$ and $d_c$.

Figure 3:
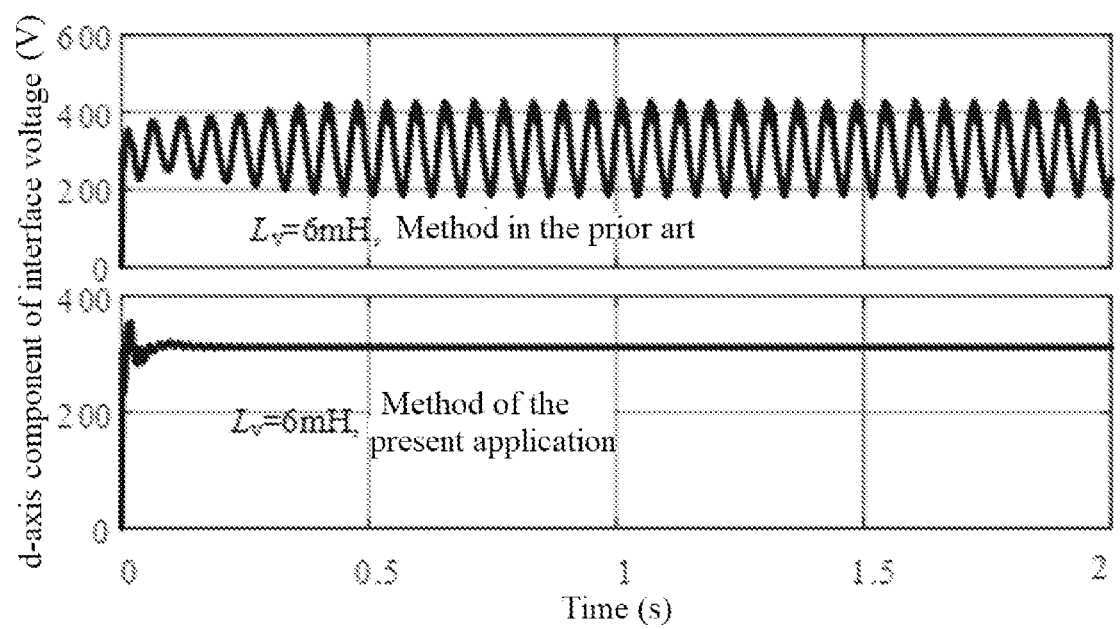
FIG. 3 shows a simulation waveform of interface voltage of a system before and after impedance remodeling in Embodiment 1 of the present invention.

FIG. 3 provides a simulation waveform of a d-axis component of interface voltage of the island microgrid system in Embodiment 1 of the present invention. When the control process in the embodiment of the present invention is not added, the d-axis component of the interface voltage of the system induces low-frequency oscillation. After the oscillation suppression method in the embodiment of the present invention is adopted, the d-axis component of the interface voltage of the system gradually stabilizes, and the system can operate stably.

What is claimed is:

1. An interactive oscillation suppression method for an island microgrid system, wherein the island microgrid system comprises a plurality of power supply units; each power supply unit comprises a source-side virtual synchronous generator and a load-side virtual synchronous generator; the source-side virtual synchronous generator and the load-side virtual synchronous generator are connected in series; the load-side virtual synchronous generator is connected to a load; and the interactive oscillation suppression method comprises the following steps:

obtaining an output voltage amplitude $E_m$ of the source-side virtual synchronous generator according to a d-axis component $u_d$ of three-phase output voltage of the source-side virtual synchronous generator, instantaneous reactive power Q of the source-side virtual synchronous generator and an instruction value $Q_{set}$ of the instantaneous reactive power Q, wherein a calculation formula for $E_m$ is as follows:

$$E_m = (D_q(U_n - u_d) + Q_{set} - Q)/(Ks);$$

wherein $D_q$ represents a given reactive power-voltage droop coefficient; $U_n$ represents a rated terminal voltage amplitude of the source-side virtual synchronous generator; K is a given excitation regulation coefficient; and s is a Laplace operator;

obtaining a phase angle θ of the source-side virtual synchronous generator according to active power P of the source-side virtual synchronous generator and an instruction value P* of the active power P, wherein a calculation formula for θ is:

$$\theta = \frac{P^* - P + D_p \omega_n^2}{(Js + D_p)s\omega_n};$$

wherein $D_p$ represents a damping coefficient; $\omega_n$ represents a synchronous angular velocity of an island microgrid system; and J is a rotor inertia of the source-side virtual synchronous generator;

obtaining a voltage instruction value $u_d^*$ of the d-axis and a voltage instruction value $u_q^*$ of the q-axis according to the voltage amplitude $E_m$ of the source-side virtual synchronous generator, wherein the instruction values $u_d^*$ and $u_q^*$ are calculated as follows:

$$\begin{bmatrix} u_d^* \\ u_q^* \end{bmatrix} = \begin{bmatrix} E_m \\ 0 \end{bmatrix} - \begin{bmatrix} L_v s + R_v & -\omega_n L_v \\ L_v & L_v s + R_v \end{bmatrix} \begin{bmatrix} i_d \\ i_q \end{bmatrix};$$

wherein $i_d$ and $i_q$ are a d-axis component and a q-axis component of three-phase current of the source-side virtual synchronous generator respectively; and $R_v$ and $L_v$ are a resistance value and an inductance value of given virtual impedance respectively;

solving a differences between the voltage instruction value $u_d^*$ of the d-axis and a d-axis component of three-phase voltage of the source-side virtual synchronous generator, and solving a difference between the voltage instruction value $u_q^*$ of the q-axis and a q-axis component of three-phase voltage of the source-side virtual synchronous generator, and respectively performing PI control on the differences to obtain current instruction values $i_{d0}^*$ and $i_q^*$;

calculating an instruction value $i_d^*$ of the d-axis current component of the three-phase output current of the source-side virtual synchronous generator by using the following formula: $i_d^* = i_{d0}^* - i_{d1}^* + i_{d2}^*$;

solving a difference between the d-axis current instruction value $i_d^*$ and a d-axis component $i_d$ of the three-phase current of the source-side virtual synchronous generator, and solving a difference between the q-axis current instruction value $i_q^*$ and a q-axis component $i_q$ of the three-phase current of the source-side virtual synchronous generator, and using the differences as input of a PI controller respectively to obtain a duty ratio $d_d$ of the d-axis and a duty ratio $d_q$ of the q-axis; and obtaining duty ratios $d_a$, $d_b$ and $d_c$ in a three-phase static coordinate system according to the duty ratio $d_d$ of the d-axis, the duty ratio $d_q$ of the q-axis and the phase angle ϑ of the source-side virtual synchronous generator, and controlling on-off of a switch tube of the source-side virtual synchronous generator according to the duty ratios $d_a$, $d_b$ and $d_c$ according to the duty ratios $d_a$, $d_b$ and $d_c$, $$\begin{cases} d_a = d_d \cos(\theta) - d_q \sin(\theta) \\ d_b = d_d \cos\left(\theta - \frac{2\pi}{3}\right) - d_q \sin\left(\theta - \frac{2\pi}{3}\right). \\ d_c = d_d \cos\left(\theta + \frac{2\pi}{3}\right) - d_q \sin\left(\theta + \frac{2\pi}{3}\right) \end{cases}$$

2. The interactive oscillation suppression method for an island microgrid system according to claim 1, wherein in the step of calculating the instruction value $i_d^*$, $i_{d1}^*$ and $i_{d2}^*$ are a voltage feedback component and a current feedforward component of the d-axis respectively, which are calculated as follows:

$$i_{d1}^* = \left( \frac{C_f s}{T_c s + 1} + \frac{L_f C_f s^2}{G_m G_i (T_c s + 1)} \right) u_d;$$

$$i_{d2}^* = \frac{1}{T_c s + 1} + \frac{L_f s}{G_m G_i (T_c s + 1)^2} i_d;$$

wherein $L_f$ and $C_f$ are an inductance value and a capacitance value of an LC filter of the source-side virtual synchronous generator; $T_c$ is a time constant of a low-pass filter; $G_m = U_{dc0}/2$; and $G_i = k_{pi} + k_{ii}/s$, wherein $k_{pi}$ and $k_{ii}$ are a proportional gain and an integral gain of the current PI controller.

3. An interactive oscillation suppression system for an island microgrid system, comprising a computer device, wherein the computer device comprises a processor configured to execute the steps of the interactive oscillation suppression method according to claim 2.

4. An island microgrid system, comprising a plurality of power supply units, wherein each power supply unit comprises a source-side virtual synchronous generator and a load-side virtual synchronous generator; the source-side virtual synchronous generator and the load-side virtual synchronous generator are connected in series; the load-side virtual synchronous generator is connected to a load; the source-side virtual synchronous generator is connected to a processor; and the processor is configured to execute the steps of the interactive oscillation suppression method according to claim 2.

5. The island microgrid system according to claim 4, wherein the processor samples the three-phase output current of the source-side virtual synchronous generator through a current sampling circuit; the processor samples line voltage of an LC filter in the source-side virtual synchronous generator through a voltage sampling circuit; and the processor outputs a duty ratio signal to a switch tube of the source-side virtual synchronous generator.

6. An interactive oscillation suppression system for an island microgrid system, comprising a computer device, wherein the computer device comprises a processor configured to execute the steps of the interactive oscillation suppression method according to claim 1.

7. An island microgrid system, comprising a plurality of power supply units, wherein each power supply unit comprises a source-side virtual synchronous generator and a load-side virtual synchronous generator; the source-side virtual synchronous generator and the load-side virtual synchronous generator are connected in series; the load-side virtual synchronous generator is connected to a load; the source-side virtual synchronous generator is connected to a processor; and the processor is configured to execute the steps of the interactive oscillation suppression method according to claim 1.

8. The island microgrid system according to claim 7, wherein the processor samples the three-phase output current of the source-side virtual synchronous generator through a current sampling circuit; the processor samples line voltage of an LC filter in the source-side virtual synchronous generator through a voltage sampling circuit; and the processor outputs a duty ratio signal to a switch tube of the source-side virtual synchronous generator.

* * * * *